(12) United States Patent
Toennies

(10) Patent No.: US 11,629,736 B2
(45) Date of Patent: Apr. 18, 2023

(54) FILTER FOR A HYDRAULIC CIRCUIT OF AN AGRICULTURAL SYSTEM

(71) Applicant: CNH Industrial America LLC, New Holland, PA (US)

(72) Inventor: Heath A. Toennies, Eureka, IL (US)

(73) Assignee: CNH Industrial America LLC, New Holland, PA (US)

( * ) Notice: Subject to any disclaimer, the term of this patent is extended or adjusted under 35 U.S.C. 154(b) by 24 days.

(21) Appl. No.: 17/324,820

(22) Filed: May 19, 2021

(65) Prior Publication Data

US 2021/0363731 A1 Nov. 25, 2021

Related U.S. Application Data

(60) Provisional application No. 63/028,751, filed on May 22, 2020.

(51) Int. Cl.
*F15B 21/041* (2019.01)

(52) U.S. Cl.
CPC ....... *F15B 21/041* (2013.01); *F15B 2211/611* (2013.01); *F15B 2211/615* (2013.01)

(58) Field of Classification Search
CPC .............. F15B 21/041; F15B 2211/611; F15B 2211/615
See application file for complete search history.

(56) References Cited

U.S. PATENT DOCUMENTS 3,744,244 A * 7/1973 Swoager ................. F16H 39/02
418/47
3,818,940 A 6/1974 Espeel
3,908,693 A 9/1975 Cooper
4,180,988 A 1/1980 Forte et al.
4,439,984 A 4/1984 Martin
4,469,594 A * 9/1984 Poetter ................... B01D 35/12
210/167.04

(Continued)

FOREIGN PATENT DOCUMENTS

DE 102018108130 B3 * 6/2019 ............... F15B 7/10
WO 1999020875 A1 4/1999

OTHER PUBLICATIONS

Shoemaker Inc., Inline Filter, Jan. 21, 2013, p. 1, http://www.shoemakerinc.com/media/files/57_8055.pdf.

*Primary Examiner* — Kenneth Bomberg
*Assistant Examiner* — Matthew Wiblin
(74) *Attorney, Agent, or Firm* — Rebecca Henkel; Rickard DeMille

(57) ABSTRACT

A hydraulic system for an agricultural system includes a hydraulic circuit and a bi-directional filter disposed on a bi-directional fluid line of the hydraulic circuit. The bi-directional filter includes a check valve fluid line having a check valve configured to block a fluid from flowing through the check valve fluid line in a first direction and to enable the fluid to flow through the check valve fluid line in a second direction, opposite the first direction, and a filter fluid line having a filter configured to enable the fluid to flow through the filter fluid line in the first direction and the second direction. The filter is configured to block particles that are greater than a threshold size from passing through the filter fluid line, and the filter fluid line is in a parallel flow configuration with respect to the check valve fluid line.

18 Claims, 4 Drawing Sheets

(56) References Cited

U.S. PATENT DOCUMENTS

| | | | |
|---|---|---|---|
| 5,144,801 A * | 9/1992 | Scanderbeg | F15B 15/18 |
| | | | 60/475 |
| 5,810,031 A | 9/1998 | Evans et al. | |
| 6,722,508 B2 | 4/2004 | Parker et al. | |
| 8,020,623 B2 | 9/2011 | Parks et al. | |
| 8,375,982 B2 | 2/2013 | Gray, Jr. | |
| 9,416,798 B2 | 8/2016 | Uenishi et al. | |
| 9,683,669 B2 | 6/2017 | Luthi et al. | |
| 10,408,237 B2 | 9/2019 | Meehan et al. | |
| 2012/0006740 A1 | 1/2012 | Swift, Jr. | |
| 2017/0036144 A1 | 2/2017 | Jacquerie et al. | |
| 2019/0264644 A1 | 8/2019 | LaCorre et al. | |

\* cited by examiner

FILTER FOR A HYDRAULIC CIRCUIT OF AN AGRICULTURAL SYSTEM

CROSS-REFERENCE TO RELATED APPLICATION

This application claims priority from and the benefit of U.S. Provisional Application Serial No. 63/028,751, entitled "FILTER FOR A HYDRAULIC CIRCUIT OF AN AGRICULTURAL SYSTEM," filed May 22, 2020, which is hereby incorporated by reference in its entirety for all purposes.

BACKGROUND

The disclosure relates generally to an agricultural system and, more specifically, to filtering contaminants within a hydraulic circuit of the agricultural system.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

An agricultural system may include an agricultural tilling implement for cultivating soil. Agricultural tilling implements may include ground engaging tools that are configured to engage the soil. For example, the implement may be towed through a field to break up clods of soil during operation of the implement to provide a more amenable soil structure for planting and/or to level the soil surface. Certain implements may be towed by a work vehicle of the agricultural system such that the implement moves with the work vehicle through the field. In some embodiments, hydraulic fluid may be used to control operation of the implement and/or the work vehicle. For example, hydraulic fluid may flow between the work vehicle and the implement via a hydraulic system to move certain components of the implement. Unfortunately, there may be contaminants within a hydraulic circuit of the hydraulic system, and the flow of the contaminants through the hydraulic circuit may affect performance of the hydraulic system and therefore an operation of the agricultural system.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In certain embodiments, a hydraulic system for an agricultural system includes a hydraulic circuit and a bi-directional filter disposed on a bi-directional fluid line of the hydraulic circuit. The bi-directional filter includes a check valve fluid line having a check valve configured to block a fluid from flowing through the check valve fluid line in a first direction and to enable the fluid to flow through the check valve fluid line in a second direction, opposite the first direction, and a filter fluid line having a filter configured to enable the fluid to flow through the filter fluid line in the first direction and the second direction. The filter is configured to block particles that are greater than a threshold size from passing through the filter fluid line, and the filter fluid line is in a parallel flow configuration with respect to the check valve fluid line.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
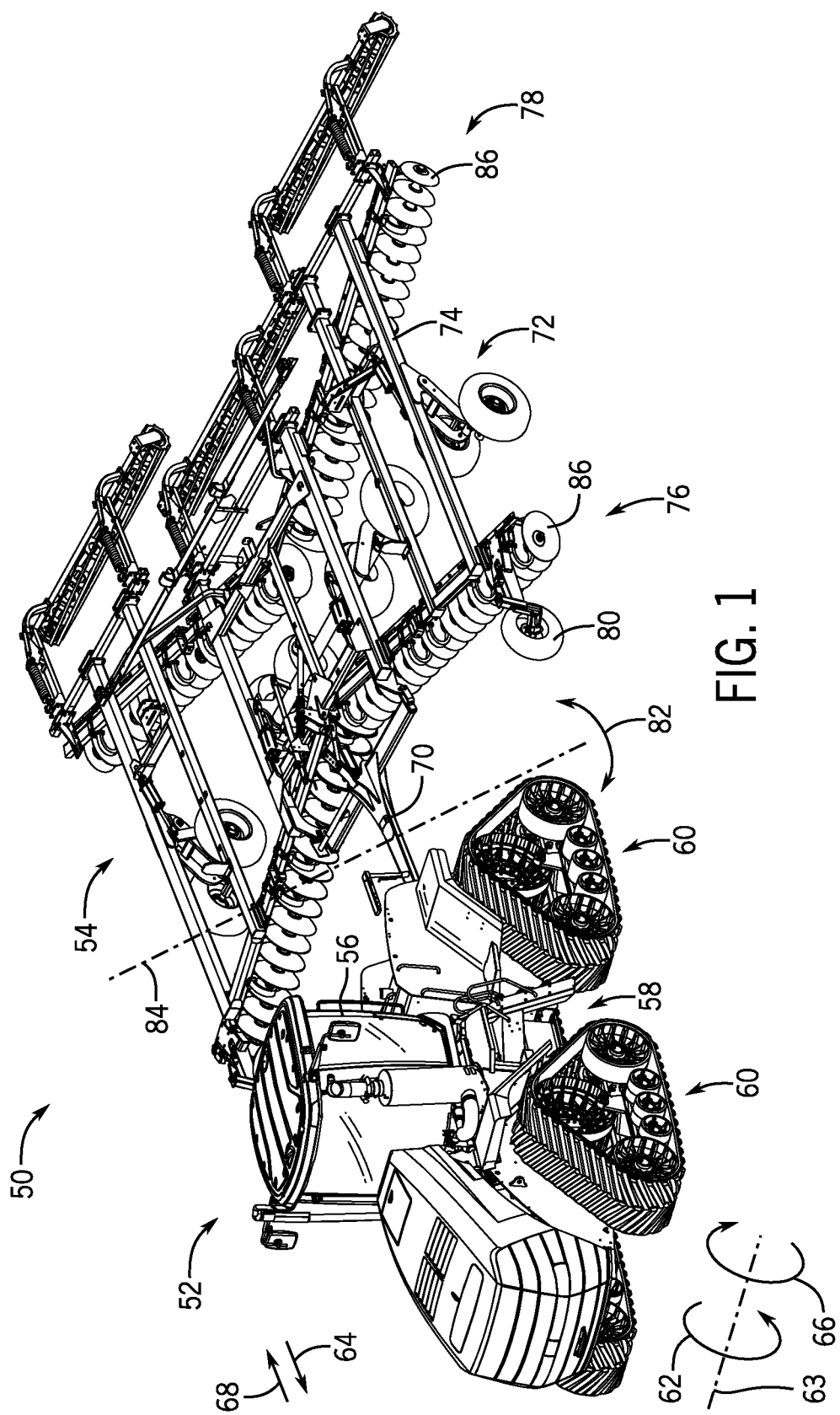
FIG. 1 is a perspective view of an embodiment of an agricultural system having a work vehicle and an agricultural implement, in accordance with an aspect of the present disclosure.

One or more specific embodiments of the present disclosure will be described below. In an effort to provide a concise description of these embodiments, all features of an actual implementation may not be described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Embodiments of the present disclosure relate to an agricultural system having an agricultural implement configured to perform an agricultural operation within a field. The agricultural system may include a hydraulic system configured to direct fluid to various components of the agricultural system to operate the components. For example, the hydraulic system may direct fluid flow to certain components of the agricultural system to cause the components to move.

Unfortunately, there may be contaminants within the hydraulic system, such as within the fluid flowing through the hydraulic system. Such contaminants may include particles such as dirt, dust, and/or debris, which may be transferred from an ambient environment into the hydraulic system (e.g., during operation of the agricultural system) and/or may have entered the hydraulic system during manufacture of the hydraulic system. The contaminants may affect performance of the hydraulic system, such as by affecting flow of fluid through the hydraulic system and/or operation of certain components (e.g., a valve) of the hydraulic system. In this manner, the contaminants may reduce an effectiveness of the hydraulic system and the agricultural system.

Accordingly, reducing contaminant flow to certain sections of the hydraulic system may improve the operation of the agricultural system. In the embodiments disclosed herein, the hydraulic system may include a hydraulic filter configured to block contaminants from flowing toward certain components of the hydraulic system (e.g., components of a hydraulic circuit located within the agricultural implement). In some embodiments, the hydraulic filter may also enable contaminants to flow away from such components of the hydraulic system. For example, the hydraulic filter may include a strainer or screen configured to block contaminants from flowing through the hydraulic filter in a first direction, and the hydraulic filter may include a flow path configured to enable contaminants to flow through the hydraulic filter in a second direction, opposite the first direction. Accordingly, the flow path may enable the fluid to carry the contaminants through the hydraulic filter in a direction away from a section of the hydraulic system. In this manner, the hydraulic filter may reduce contaminant flow into the section of the hydraulic system while enabling contaminant flow out of the section of the hydraulic system, thereby reducing the amount of contaminants in the section and improving operation of the agricultural system.

Turning to the drawings, FIG. 1 is a perspective view of an embodiment of an agricultural system 50 that includes a work vehicle 52 and an agricultural implement 54. In the illustrated embodiment, the work vehicle 52 is a tractor. However, in some embodiments, the work vehicle 52 may be an on-road truck, a harvester, and so forth, that may be driven over a field, such as a farming field. As illustrated, the work vehicle 52 includes a cab 56 mounted on a chassis 58. The chassis 58 may support components, such as a motor, a hydraulic system (e.g., a pump, valves, a reservoir), an electrical system (e.g., a control system), a cooling system (e.g., an engine coolant system, a heating, ventilation, and/or air conditioning system), and the like, to facilitate operation of the work vehicle 52. Additionally, the work vehicle 52 includes tracks 60 (e.g., wheels) that operate to move the work vehicle 52. For example, the front and/or the rear tracks 60 may rotate in a first rotational direction 62 (e.g., a forward rotational direction) about a lateral axis 63 to drive the work vehicle 52 in a first direction 64 (e.g., a forward direction), and the front and/or rear tracks 60 may rotate in a second rotational direction 66 (e.g., reverse rotational direction) about the lateral axis 63, opposite the first rotational direction 62, to drive the work vehicle 52 in a second direction 68 (e.g., backward direction), opposite the first direction 64. The tracks 60 (e.g., the front tracks and/or the rear tracks) may also be steered to turn the work vehicle 52. In additional or alternative embodiments, a portion (e.g., a rear portion) of the chassis may rotate relative to a remaining portion (e.g., a front portion) of the chassis to steer the work vehicle.

The cab 56 is configured to house an operator of the work vehicle 52 during operation of the agricultural system 50. The cab 56 may provide access to various controls of the work vehicle 52. For example, the cab 56 may include a user interface to enable the operator to control the operation of certain systems of the work vehicle 52. In some embodiments, the cab 56 may include a component, such as a steering wheel, to enable the operator to steer the tracks 60 to turn the work vehicle 52. In addition, the cab may include other and/or additional types of user interfaces (e.g., a touch screen, a hand controller, a push button, a track pad) configured to receive user input or feedback for controlling various operations and systems of the work vehicle.

Moreover, the chassis 58 is coupled to the agricultural implement 54 to enable the work vehicle 52 to tow the agricultural implement 54. For example, the chassis 58 may be coupled to a hitch 70 of the agricultural implement 54 (e.g., via a corresponding hitch of the work vehicle). In addition, the agricultural implement 54 includes main wheels 72 that enable the agricultural implement 54 to move, such as over the field through which the work vehicle 52 is navigating. Thus, movement of the work vehicle 52 drives movement of the agricultural implement 54. For example, movement of the work vehicle 52 in the first direction 64 drives the agricultural implement 54 to move in the first direction 64, and movement of the work vehicle 52 in the second direction 68 drives the agricultural implement 54 to move in the second direction 68. In certain embodiments, the agricultural implement 54 may also be steerable. By way of example, the main wheels 72 may be turned to steer the agricultural implement 54.

In some embodiments, the agricultural implement 54 may be a tilling implement (e.g., vertical tilling implement) configured to break up soil within the field during operation of the agricultural system 50. The agricultural implement 54 includes a frame 74 to which the main wheels 72 are coupled. As illustrated in FIG. 1, the main wheels 72 are located between a first end 76 (e.g., front end) of the agricultural implement 54 and a second end 78 (e.g., rear end) of the agricultural implement 54. The agricultural implement 54 includes gauge wheels 80 that are coupled to the frame 74, such as at the first end 76. The gauge wheels 80 may be used to reduce an amount of lateral and/or vertical movement of the agricultural implement 54 while the agricultural system 50 is in operation. For example, the gauge wheels 80 may engage the soil surface while the work vehicle 52 tows the agricultural implement 54, such that movement of the agricultural implement 54 along the lateral axis 63 and/or movement of the agricultural implement 54 along a vertical axis 84 is reduced.

The agricultural implement 54 also includes disc blades 86 that are coupled to the frame 74. In the illustrated embodiments, the disc blades 86 of the agricultural implement 54 are arranged in rows, including a first blade row 88, a second blade row 90, a third blade row 92, and a fourth blade row 94. The first blade row 88 and the second blade row 90 may each be positioned at the first end 76 of the agricultural implement 54, and the third blade row 92 and the fourth blade row 94 may each be positioned at the second end 78 of the agricultural implement 54. In some embodiments, the first blade row 88 may be positioned adjacent to and at an angle with respect to the second blade row 90, and the third blade row 92 may be positioned adjacent to and at an angle with respect to the fourth blade row 94. Thus, the blade rows 88, 90, 92, 94 may form an x-shaped configuration on the agricultural implement 54. In additional or alternative embodiments, the disc blades may be arranged in a different configuration on the agricultural implement (e.g., a k-shaped configuration, a diamond configuration, a parallel configuration), and/or the agricultural implement may include a different number of rows of disc blades.

During operation of the agricultural system 50, the disc blades 86 may engage soil of the field. For instance, the main wheels 72 may be positioned to set the position of the frame 74 at a target height above the soil surface. By way of example, the main wheels 72 may move (e.g., translate, rotate) away from the frame 74 to drive the frame 74 away from the soil surface, and the main wheels 72 may move toward the frame 74 to drive the frame 74 toward the soil surface. As the agricultural implement 54 is towed by the work vehicle 52, the disc blades 86 may rotate while engaged with the soil to till the soil. Each disc blade 86 may, for example, be non-translatably coupled to the frame 74, such that movement of the main wheels 72 relative to the frame 74 changes the position of the disc blades 86 relative to the soil surface (e.g., to engage or disengage the disc blades 86 from the soil). In some embodiments, the disc blades 86 may be concave or may have certain surface features (e.g., flutes) that facilitate tilling of the soil. In additional or alternative embodiments, the agricultural implement 54 may include other suitable type(s) of ground engaging tool(s), such as tillage points, tines, and so forth.

Although the position of the disc blades 86 relative to the soil surface is adjusted by controlling the position of the main wheels in the illustrated embodiment, in additional or alternative embodiments, the position of the disc blades may be adjusted in other manners. For example, the hitch may be raised and/or lowered relative to the soil surface (e.g., via adjustment of the hitch of the work vehicle) to adjust the position and/or a pitch of the agricultural implement, thereby adjusting the position of the disc blades relative to the soil surface. In further embodiments, the disc blades may be directly adjustable relative to the implement frame. For example, groups of disc blades may be adjustable via a subframe of the agricultural implement.

The agricultural implement 54 may include basket assemblies 96, which may be disposed at the second end 78 of the agricultural implement 54. The basket assemblies 96 are configured to engage the soil surface during operation of the agricultural system 50. For example, as the work vehicle 52 tows the agricultural implement 54 in the first direction 64, each basket assembly 96 may provide a downward force on the soil and rotate to level the soil tilled by the disc blades 86 and/or to cut crop residue in the field. Although the agricultural implement 54 has three basket assemblies 96 in the illustrated embodiment, additional or alternative embodiments of the agricultural implement may have any suitable number of basket assemblies and/or any other suitable component(s) (e.g., tines) configured to level the soil during operation of the agricultural system. In some embodiments, the basket assemblies 96 may also stabilize the agricultural implement 54 during operation of the agricultural system 50. For example, the basket assemblies 96 may dampen vertical movement of the agricultural implement 54 by providing a downward pressure. The agricultural implement may have any suitable alternate configuration, such as having no gauge wheels, no main wheels, no baskets, any other suitable configuration, or any combination thereof. The agricultural implement may also be any other suitable type of agricultural implement, such as a planting implement, a seeding implement, and so forth.

Figure 2:
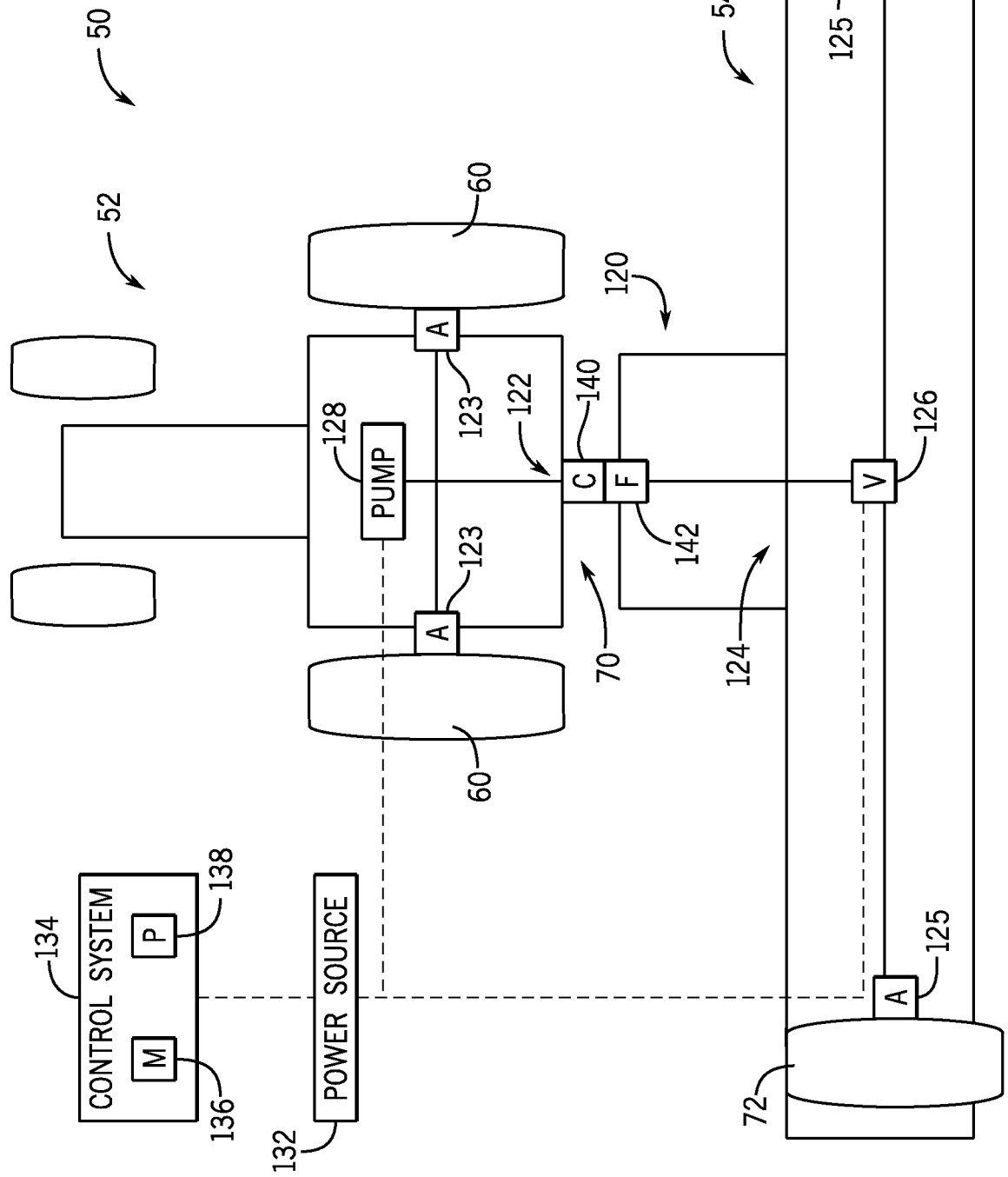
FIG. 2 is a top schematic view of an embodiment of the agricultural system of FIG. 1 having the work vehicle and the agricultural implement, in accordance with an aspect of the present disclosure.

FIG. 2 is a top schematic view of an embodiment of the agricultural system 50 of FIG. 1 having the work vehicle 52 and the agricultural implement 54. In certain embodiments, the agricultural system 50 includes a hydraulic system 120 for operating certain components of the agricultural system 50. For example, the hydraulic system 120 may direct fluid (e.g., hydraulic fluid) to certain components of the agricultural implement 54 and/or the work vehicle 52 to actuate the components. As used herein, fluid or fluid flow refers to the fluid flowing through any section of the hydraulic system 120. In the illustrated embodiment, the hydraulic system 120 includes a first hydraulic circuit 122 (e.g., a hydraulic circuit of the work vehicle 52) and a second hydraulic circuit 124 (e.g., a hydraulic circuit of the agricultural implement 54). In some embodiments, the first hydraulic circuit 122 may direct fluid to components within the work vehicle 52. For instance, the first hydraulic circuit 122 may direct fluid to actuators 123 of the tracks 60 to control steering of the work vehicle 52. The second hydraulic circuit 124 may direct fluid to components within the agricultural implement 54. Further, as described below, various components of the hydraulic system 120 (e.g., a valve, a pump) may control fluid flow between the first hydraulic circuit 122 and the second hydraulic circuit 124. For example, respective amounts of fluid within the first hydraulic circuit 122 and the second hydraulic circuit 124 may be controlled to facilitate operation of components of the work vehicle 52 and components of the agricultural implement 54.

In the illustrated embodiment, the second hydraulic circuit 124 is configured to direct fluid to and receive fluid from main wheel actuators 125. As an example, each main wheel 72 may be coupled to a respective hydraulic cylinder, and directing fluid into and out of the hydraulic cylinder may move the respective main wheel 72 relative to the frame of the agricultural implement 54. In certain embodiments, directing fluid into the hydraulic cylinder drives the respective main wheel 72 away from the frame, thereby raising the frame relative to the soil surface, and enabling fluid to flow out of the hydraulic cylinder causes the respective main wheel 72 to move toward the frame, thereby lowering the frame relative to the soil surface. Additionally or alternatively, the hydraulic system may direct fluid to any other suitable component to operate the agricultural system.

The hydraulic system 120 may also include various components to direct fluid through the hydraulic system 120. As an example, the hydraulic system 120 may include one or more valves 126 configured to control flow (e.g., a rate of fluid flow) through the hydraulic system 120. The illustrated valve 126 controls fluid flow to and/or from the main wheel actuators 125. For instance, a configuration and/or position of the valve 126 may be set to control fluid flow to and/or from the main wheel actuators 125 and, therefore, control how the main wheels 72 are adjusted relative to the frame of the agricultural implement 54. Moreover, the hydraulic system 120 includes a pump 128, which may be configured to direct fluid flow through the first hydraulic circuit 122 and the second hydraulic circuit 124. By way of example, the pump 128 may direct fluid flow from a reservoir of the first hydraulic circuit 122 to various components of the work vehicle and/or the implement (e.g., coupled to the first and/or second hydraulic circuits 122, 124).

Certain components of the illustrated hydraulic system 120 are operated via electrical power. For instance, electrical power is supplied to set the configuration of the valve 126 (e.g., a solenoid valve) and/or to drive operation of the pump 128. To this end, the agricultural system 50 includes a power source 132 configured to supply electric power to the respective components of the hydraulic system 120. Further, the agricultural system 50 includes a control system 134 communicatively coupled to the power source 132. The power source 132 is configured to supply electrical power to the control system 134, thereby enabling the control system 134 to output control signal(s) to various components, such as to control power flow to the components to move and operate the components. The control system 134 includes a memory 136 and processing circuitry 138. The memory 136 may include volatile memory, such as random-access memory (RAM), and/or non-volatile memory, such as read-only memory (ROM), optical drives, hard disc drives, solid-state drives, or any other non-transitory computer-readable medium that includes instructions executable by the processing circuitry 138. The processing circuitry 138 may include one or more application specific integrated circuits (ASICs), one or more field programmable gate arrays (FPGAs), one or more general purpose processors, or any combination thereof, configured to execute the instructions stored in the memory 138 to operate the agricultural system 50. For example, the instructions stored in the memory 138 cause the processing circuitry 138 to output a control signal to components of the hydraulic system 120 and direct fluid through the hydraulic system 120 to operate the agricultural system 50.

Additionally, the first hydraulic circuit 122 is configured to fluidly couple to the second hydraulic circuit 124 via a hydraulic coupler 140 (e.g., a quick disconnect), which may be positioned adjacent to the hitch 70, for instance. Thus, the fluid may flow between the first hydraulic circuit 122 and the second hydraulic circuit 124 through the hydraulic coupler 140. In certain embodiments, the hydraulic coupler 140 may be configured to removably couple the first hydraulic circuit 122 to one of various second hydraulic circuits of different agricultural implements. That is, the hydraulic coupler 140 may fluidly couple to any one of a variety of hydraulic circuits of different agricultural implements, thereby enabling the work vehicle 52 to tow and operate different agricultural implements. Thus, the agricultural implement 54 may be easily decoupled from the work vehicle 52 (e.g., to replace the agricultural implement 54 with a different agricultural implement) without having to modify or remove the first hydraulic circuit 122, and the hydraulic coupler 140 may enable the first hydraulic circuit 122 to easily couple to a corresponding hydraulic circuit of another agricultural implement.

Unfortunately, in some circumstances, there may be contaminants flowing within the hydraulic system 120. As an example, the contaminants may be introduced within the hydraulic system 120 during manufacture of the hydraulic system 120 (e.g., of the second hydraulic circuit 124). As another example, the contaminants may enter the hydraulic system 120 (e.g., from an ambient environment) during operation of the agricultural system 50. For instance, dust, dirt, and/or other debris may enter the hydraulic system 120 via the hydraulic coupler 140. It may be desirable to limit the amount of contaminants in a section of the hydraulic system 120 to enhance operation of the hydraulic system 120 and, therefore, the agricultural system 50. For this reason, the hydraulic system 120 includes a filter 142 configured to block contaminants from flowing in a first direction through the filter 142 (e.g., from the first hydraulic circuit 122 to the second hydraulic circuit 124). In some embodiments, the filter 142 is also configured to enable contaminants to flow in a second direction through the filter 142 (e.g., from the second hydraulic circuit 124 toward the first hydraulic circuit 122). In this manner, the filter 142 may reduce the amount of contaminants in the second hydraulic circuit 124 (e.g., a certain section of the second hydraulic circuit 124).

Figure 3:
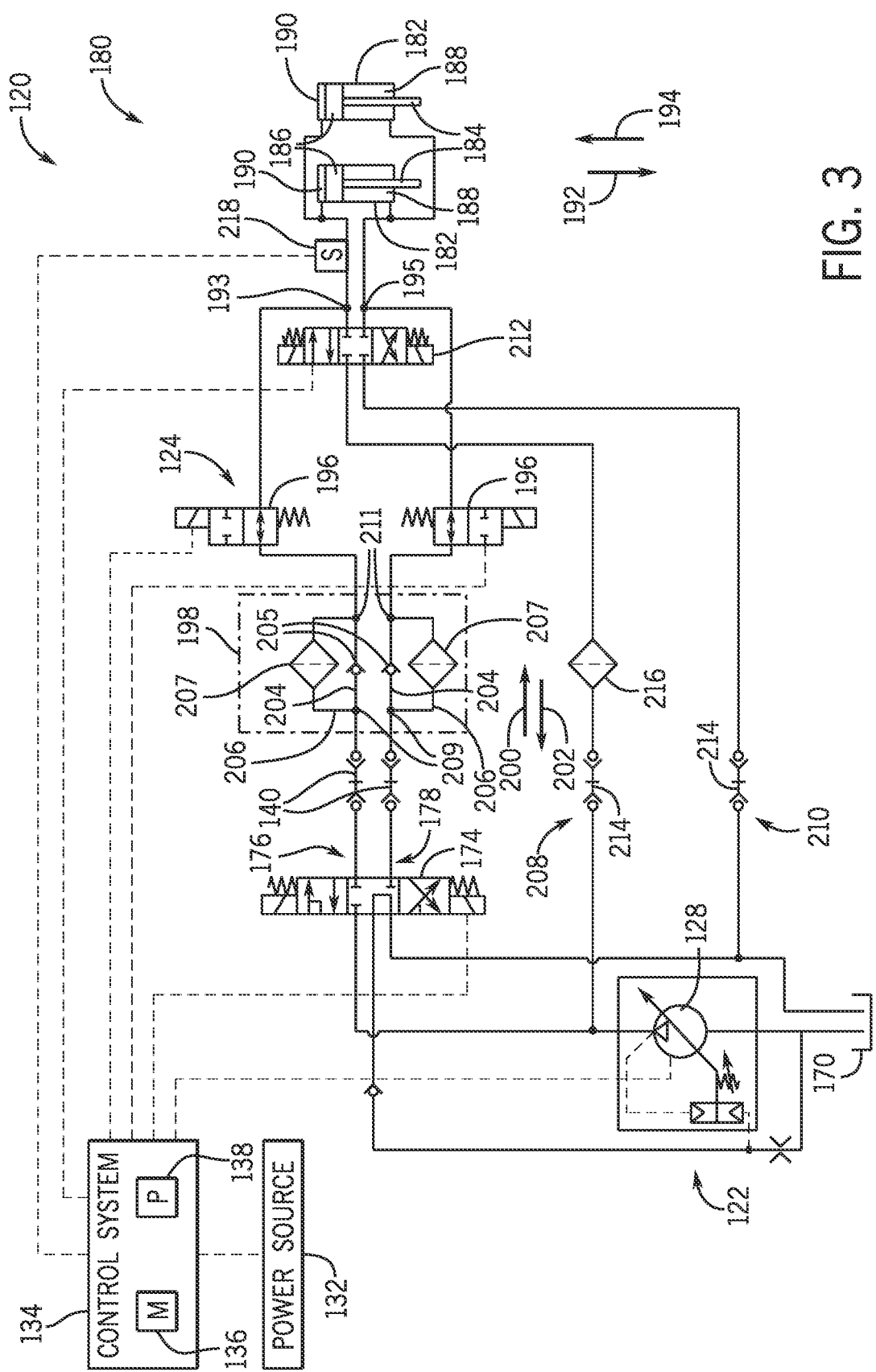
FIG. 3 is a schematic diagram of an embodiment of a hydraulic system that may be employed by the agricultural system of FIGS. 1 and 2, in accordance with an aspect of the present disclosure.

FIG. 3 is a schematic diagram of an embodiment of the hydraulic system 120 that may be employed by the agricultural systems of FIGS. 1 and 2. The hydraulic system 120 includes the first hydraulic circuit 122 of the work vehicle coupled to the second hydraulic circuit 124 of the agricultural implement via the hydraulic coupler 140. The first hydraulic circuit 122 includes a reservoir 170, which may hold fluid of the hydraulic system 120. The first hydraulic circuit 122 also includes the pump 128 fluidly coupled to the reservoir 170. The pump 128 may direct fluid from the reservoir 170 to a first valve 174 (e.g., a first flow valve), which is configured to control fluid flow between the first hydraulic circuit 122 and the second hydraulic circuit 124. By way of example, the first valve 174 may enable fluid flow from the reservoir 170 to one of a first bi-directional fluid line 176 or a second bi-directional fluid line 178 to control fluid flow through the hydraulic coupler 140 to the second hydraulic circuit 124.

The second hydraulic circuit 124 includes one or more hydraulic cylinders 180. Each hydraulic cylinder 180 may be coupled to a component of the agricultural implement (e.g., one of the main wheels). Each hydraulic cylinder 180 may include a body 182, which may be coupled to the frame of the agricultural implement, and a rod 184 coupled to a respective piston 186. Each piston 186 fluidly separates the corresponding body 182 into a rod section 188 and a cap section 190. That is, the piston 186 may block fluid flow between the rod section 188 and the cap section 190. In addition, the piston 186 is movable within the body 182 in response to a pressure differential between the rod section 188 and the cap section 190. For example, increasing the fluid pressure in the cap section 190 to be greater than the fluid pressure in the rod section 188 may drive the piston 186 to move in a first direction 192, which may extend the rod 184 farther out of the body 182. Further, increasing the fluid pressure in the rod section 188 to be greater than the fluid pressure in the cap section 190 may drive the piston 186 to move in a second direction 194, opposite the first direction 192, to retract the rod 184 farther into the body 182. Movement of the rod 184 and the piston 186 within the body 182 may drive movement of the component of the agricultural implement. For instance, each rod 184 may be coupled to the component (e.g., via a linkage system), and directing fluid flow into and/or out of the hydraulic cylinder 180 (e.g., via a tubing, a conduit, a valve, a pump) to move the rod 184 within the body 182, thereby driving movement of the component (e.g., relative to the frame of the agricultural implement).

In the illustrated embodiment, the first bi-directional fluid line 176 is fluidly coupled to the cap section 190 of each hydraulic cylinder 180 (e.g., the first bi-directional fluid line 176 terminates at a first junction 193 that is fluidly coupled to the cap section 190 of each hydraulic cylinder 180), and the second bi-directional fluid line 178 is fluidly coupled to the rod section 188 of each hydraulic cylinder 180 (e.g., the second bi-directional fluid line 178 terminates at a second junction 195 that is fluidly coupled to the rod section 188 of each hydraulic cylinder 180). Therefore, the positioning of the first valve 174 selectively enables fluid to flow from the pump 128 to one of the rod section 188 or the cap section 190, and enables fluid to flow from the other of the rod section 188 or the cap section 190 to the reservoir 170. As an example, a first position of the first valve 174 enables fluid to flow from the pump 128 to the cap section 190 of each hydraulic cylinder 180 via the first bi-directional fluid line 176 and enables fluid to flow from the rod section 188 of the hydraulic cylinder 180 to the reservoir 170 via the second bi-directional fluid line 178, thereby driving the rod 182 to move in the first direction 192. Additionally, a second position of the first valve 174 enables fluid to flow from the pump 128 to the rod section 188 of each hydraulic cylinder 180 via the second bi-directional fluid line 178 and enables fluid to flow from the cap section 190 of the hydraulic cylinder 180 to the reservoir 170 via the first bi-directional fluid line 176, thereby driving the rod 182 to move in the second direction 194. Further still, a third position of the first valve 174 blocks fluid flow from the pump 128 to the second hydraulic circuit 124 via the first valve 174.

The second hydraulic circuit 124 includes second valves 196 (e.g., second flow valves) configured to selectively enable or block fluid flow into/out of respective sections of the hydraulic cylinders 180. As an example, one of the second valves 196 is disposed along the first bi-directional fluid line 176 to enable or block fluid flow between the first valve 174 and the cap section 190 of each hydraulic cylinder 180, and another of the second valves 196 is disposed along the second bi-directional fluid line 178 to enable or block fluid flow between the first valve 174 and the rod section 188 of each hydraulic cylinder. In certain embodiments, an open position of each of the second valves 196 may enable fluid flow so as to enable the first valve 174 to control fluid flow into/out of the hydraulic cylinders 180. A closed position of each of the second valves 196 may alternatively block fluid flow to block the first valve 174 from controlling fluid flow into/out of the hydraulic cylinders 180, such as to maintain the position of the pistons 186 within the respective bodies 182.

The hydraulic coupler 140 is disposed on the bi-directional fluid lines 176, 178 to fluidly couple the first valve 174 of the first hydraulic circuit 122 to the second hydraulic circuit 124. That is, fluid may flow through the bi-directional fluid lines 176, 178 between the first valve 174 and the hydraulic cylinders 180 via the hydraulic coupler 140. In some circumstances, contaminants may enter the hydraulic system 120 from an ambient environment via the hydraulic coupler 140. In order to block the contaminants from flowing to certain components of the second hydraulic circuit 124, a respective bi-directional filter 198 is disposed along each of the bi-directional fluid lines 176, 178 between the hydraulic coupler 140 and the hydraulic cylinders 180 (e.g., along a fluid path between the hydraulic coupler 140 and the respective second valve 196). Each bi-directional filter 198 enables fluid to flow in a first fluid direction 200 toward the hydraulic cylinders 180 (e.g., from the hydraulic coupler 140) and in a second fluid direction 202 away from the hydraulic cylinders 180 (e.g., toward the hydraulic coupler 140). In addition, each bi-directional filter 198 is configured to block contaminants from flowing in the first fluid direction 200 and to enable contaminants to flow in the second fluid direction 202, opposite the first fluid direction 200, without active control. That is, for example, the control system 134 does not output control signal(s) to adjust the configuration of each bi-directional filter.

In the illustrated embodiment, each bi-directional filter 198 includes a check valve fluid line 204, which includes a check valve 205, and a filter fluid line 206, which includes a filter 207 (e.g., a mesh, a screen, a strainer). The check valve 205 enables fluid flow and contaminant flow through each bi-directional filter 198 via the check valve fluid line 204 in the second fluid direction 202. However, the check valve 205 blocks fluid flow and contaminant flow through each bi-directional filter 198 via the check valve fluid line 204 in the first fluid direction 200. The filter 207 enables fluid flow through each bi-directional filter 198 via the filter fluid line 206 in both the first fluid direction 200 and the second fluid direction 202. In addition, the filter 207 blocks contaminant flow through the respective filter fluid line 206 in both the first fluid direction 200 and the second fluid direction 202. For instance, the filter 207 blocks particles that are greater than a threshold size from passing through. However, fluid may pass through the filter 207.

The respective filter fluid line 206 and the respective check valve fluid line 204 for each of the bi-directional filters 198 may be in a parallel flow configuration with respect to one another. That is, the respective filter fluid line 206 are fluidly coupled to the respective check valve fluid line 204 at a first inlet/outlet 209 of the bi-directional filter 198 and at a second inlet/outlet 211 of the bi-directional filter 198. In this way, fluid flowing through each bi-directional filter 198 may flow through either of the filter fluid line 206 or the check valve fluid line 204 to flow between the first inlet/outlet 209 and the second inlet/outlet 211. For example, fluid flowing through each bi-directional filter 198 in the first fluid direction 200 (e.g., from the first inlet/outlet 209 to the second inlet/outlet 211) may flow through the filter fluid line 206 but not through the check valve fluid line 204. Moreover, both the check valve 205 and the filter 207 block contaminants from flowing past each bi-directional filter 198 in the first fluid direction 200, thereby blocking the contaminants from flowing from the first valve 174 toward the hydraulic cylinders 180. Additionally, fluid flowing through each bi-directional filter 198 in the second fluid direction 202 (e.g., from the second inlet/outlet 211 to the first inlet/outlet 209) may flow through the check valve fluid line 204, which enables contaminants to flow through the bi-directional filter 198 (e.g., toward the hydraulic coupler 140 and away from the hydraulic cylinders 180). Thus, each bi-directional filter 198 is configured to block contaminant flow through the bi-directional filter 198 in the first fluid direction 200 and to enable contaminant flow through the bi-directional filter 198 in the second fluid direction 202. Therefore, the bi-directional filters 198 may block contaminant flow farther into the second hydraulic circuit 124 (e.g., to the hydraulic cylinders 180) while enabling contaminant flow away from the second hydraulic circuit 124 (e.g., to the reservoir 170), thereby reducing an amount of contaminants within the second hydraulic circuit 124.

In the illustrated embodiment, the bi-directional filters 198 enable contaminant flow into the first hydraulic circuit 122, which may not be substantially affected by the presence of contaminants. That is, the flow of contaminants within the first hydraulic circuit 122, such as to drain into the reservoir 170, may not substantially affect performance of the first hydraulic circuit 122 (e.g., to direct fluid from the reservoir 170 toward the hydraulic cylinders 180). In addition, the reduction of contaminants within the second hydraulic circuit 124 may improve the performance of the second hydraulic circuit 124 (e.g., operation of the hydraulic cylinders 180). As such, the bi-directional filters 198 may improve performance of the hydraulic system 120 and the agricultural system. In some embodiments, the bi-directional filters 198 may be elements of a single assembly. That is, the single assembly may include a first bi-directional filter 198 disposed on the first bi-directional fluid line 176 and a second bi-directional filter 198 disposed on the second bi-directional fluid line 178. Thus, upon installation of the single assembly, both bi-directional filters 198 may be disposed onto the respective bi-directional fluid lines 176, 178. In additional or alternative embodiments, the bi-directional filters may be separate components that are separately disposed on the bi-directional fluid lines. For this reason, one of the bi-directional filters may be disposed onto or removed from one of the bi-directional fluid lines without affecting the other bi-directional filter on the other of the bi-directional fluid lines.

In addition, the bi-directional filters 198 may facilitate removal of the contaminants. For this reason, the bi-directional filters 198 may be readily accessible by a user (e.g., an operator, a technician) and enable the user to access the bi-directional filters to remove the contaminants. For example, the bi-directional filters 198 may also be easily removable from the hydraulic system 120 (e.g., by decoupling the first hydraulic circuit 122 from the second hydraulic circuit 124 via the hydraulic couplers 140) and, as such, contaminants trapped within the bi-directional filters 198 (e.g., in the filter fluid lines 206) may also be easily removed from the hydraulic system 120, such as by removing the bi-directional filters 198 to clean the filters 207, replace the filters 207, and/or replace the entire bi-directional filters 198.

The hydraulic system 124 includes a first single directional fluid line 208 and a second single directional fluid line 210 in the illustrated embodiment. The first single directional fluid line 208 fluidly couples the pump 128 to a third valve 212 (e.g., a third flow valve) that enables fluid to flow from the pump 128 to one of the rod sections 188 or the cap sections 190 of the hydraulic cylinders 180 (e.g., the first directional fluid line 208 terminates at either the first junction 193 or the second junction 195 based on the position of the third valve 212). As illustrated, the fluid path from the pump to the hydraulic cylinders 180 via the first single directional fluid line 208 and the third valve 212 bypasses the bi-directional fluid lines 176, 178 (e.g., the first valve 174, the bi-directional filters 198, the second valves 196). The second single directional fluid line 210 fluidly couples the third valve 212 to the reservoir 170 to enable fluid to flow from one of the rod sections 188 or the cap sections 190 of the hydraulic cylinders 180 to the reservoir 170 (e.g., the second single directional fluid line 210 terminates at either the first junction 193 or the second junction 195 based on the position of the third valve 212). As illustrated, the fluid path from the hydraulic cylinders to the reservoir via the third valve 212 and the second single directional fluid line 210 bypasses the bi-directional fluid lines 176, 178. Each of the first single directional fluid line 208 and the second single directional fluid line 210 includes a respective hydraulic coupler 214 that couples the first hydraulic circuit 122 to the second hydraulic circuit 124 separately from the hydraulic coupler 140 at the bi-directional fluid lines 176, 178. Moreover, the first single directional fluid line 208 includes a filter 216 that blocks contaminants from flowing through the filter 216. For instance, the filter 216 blocks contaminant flow from the hydraulic coupler 214 of the first single directional fluid line 208 to the third valve 212, thereby blocking contaminant flow toward the hydraulic cylinders 180.

The illustrated third valve 212 is configured to control fluid flow through the single directional fluid lines 208, 210 to the hydraulic cylinders 180. For instance, a first position of the third valve 212 enables fluid to flow from the pump 128 to the cap sections 190 of the hydraulic cylinders 180 via the first single directional fluid line 208 and enables fluid to flow out of the rod sections 188 of the hydraulic cylinders 180 to the reservoir 170 via the second single directional fluid line 210. Additionally, a second position of the third valve 212 enables fluid to flow from the pump 128 to the rod sections 188 of the hydraulic cylinders 180 via the first single directional fluid line 208 and enables fluid to flow out of the cap sections 190 of the hydraulic cylinders 180 to the reservoir via the second single directional fluid line 210. Regardless of whether the third valve 212 is in the first position or the second position, fluid flow is enabled, while contaminant flow is blocked, through the first single directional fluid line 208 in the first fluid direction 200, and both fluid flow and contaminant flow are enabled through the second single directional fluid line 210 in the second fluid direction 202. Further, a third position of the third valve 212 blocks fluid flow from the pump 128 to the hydraulic cylinders 180 via the first and second single directional fluid lines 208, 210.

The positioning of each of the first valve 174, the second valves 196, and/or the third valve 212 may be controlled via the control system 134 (e.g., based on a control signal provided by the control system 134). In some embodiments, the control system 134 may cooperatively control the first valve 174, the second valves 196, and the third valve 212 to control the position of the hydraulic cylinders 180. By way of example, the control system 134 may output signal(s) indicative of instructions to move the third valve 212 to the third position, to move the first valve 174 to the first or second position, and to move the second valves 196 to the open position to control the position of the hydraulic cylinders 180 via fluid flow through the first valve 174, or the control system 134 may output signal(s) indicative of instructions to move the first valve 174 to the third position, to move the second valves 196 to the closed position, and to move the third valve 212 to the first or second position to control the position of the hydraulic cylinders 180 via fluid flow through the third valve 212.

For instance, during operation of the agricultural system, the control system 134 may output signal(s) indicative of instructions to move the first valve 174 and/or the second valve 196 to block fluid flow through the first valve 174, and the control system 134 may output signal(s) indicative of instructions to move the third valve 212 automatically to adjust the hydraulic cylinders 180. In certain embodiments, the hydraulic system 120 includes a sensor 218 communicatively coupled to the control system 134. Although a single sensor 218 is positioned proximate to the hydraulic cylinders 180 in the illustrated embodiment, an additional or alternative embodiment may include any suitable number of sensors 218 that are positioned at any suitable location within the hydraulic system 120 to facilitate operation of the hydraulic system 120. The control system 134 may receive sensor data from the sensor(s) 218 and may control the pump 128, the first valve 174, and/or the second valve 196 based on the sensor data so as to adjust the position of the hydraulic cylinders 180 automatically based on the sensor data (e.g., without a user input). For instance, the control system 134 may receive an indication of a target position of the pistons 186 (e.g., a respective position of the main wheels), such as based on a time of an automatic operation of the agricultural system, and the control system 134 may control the third valve 212 to move the pistons 186 to the target position based on the sensor data. To this end, the sensor data may be indicative of the position of the pistons 186, such as a position of each piston 186 within the respective bodies 182, a position of the main wheels, and the like. Additionally or alternatively, the sensor data may include a force imparted on a component (e.g., on the main wheels by the soil surface), a current position of the hydraulic cylinders, a fluid pressure in the hydraulic cylinders, a fluid flowrate within the hydraulic system, another suitable parameter, or any combination thereof, and the control system then may output a control signal (e.g., to the power source) to cause the hydraulic cylinders to adjust based on the sensor data.

Moreover, the control system 134 is configured to output signal(s) indicative of instructions to initiate an override sequence to override automatic control of the hydraulic cylinders 180 and, instead, to enable manual control or remote control of the hydraulic cylinders 180 (e.g., from the work vehicle). In the override sequence, the control system 134 may output signal(s) to move the first valve 174 and/or the second valve 196 to block fluid flow through the first valve 174 and/or the second valve 196, and the control system 134 may output signal(s) indicative of instructions to move the third valve 212 to control the hydraulic cylinders 180. For example, the control system 134 controls the position of the third valve 212 to control the positioning of the hydraulic cylinders 180 based on a user input and not based on the target positions indicated by the automatic control.

Further, the sensor(s) 218 may be used to transition between the automatic control and the override sequence. For instance, the control system 134 may analyze the sensor data received from the sensor(s) 218 to determine whether a current operating parameter indicates the automatic control or the override sequence is to be initiated. As an example, the control system 134 may suspend automatic control and initiate the override sequence to enable manual and/or remote control of the hydraulic cylinders 180 in response to the operating parameter (e.g., a fluid pressure in the hydraulic system 120) detected by the sensor(s) 218 being beyond a threshold value (e.g., a threshold fluid pressure), such as to indicate that automatic operation of the hydraulic cylinders 180 is not effectively achieving desirable performance of the agricultural system. In such cases, the threshold value may be based on a current function or operation performed by the agricultural system. As another example, the control system 134 may suspend the override sequence and initiate automatic control in response to an additional operating parameter (e.g., a position of the hydraulic cylinders 180) detected by the sensor(s) 218 being within a threshold value (e.g., within a threshold range of a target position indicated by the automatic control). As such, the sensor(s) 218 may enable the agricultural system to operate in a suitable mode to achieve a desirable operation or performance.

Figure 4:
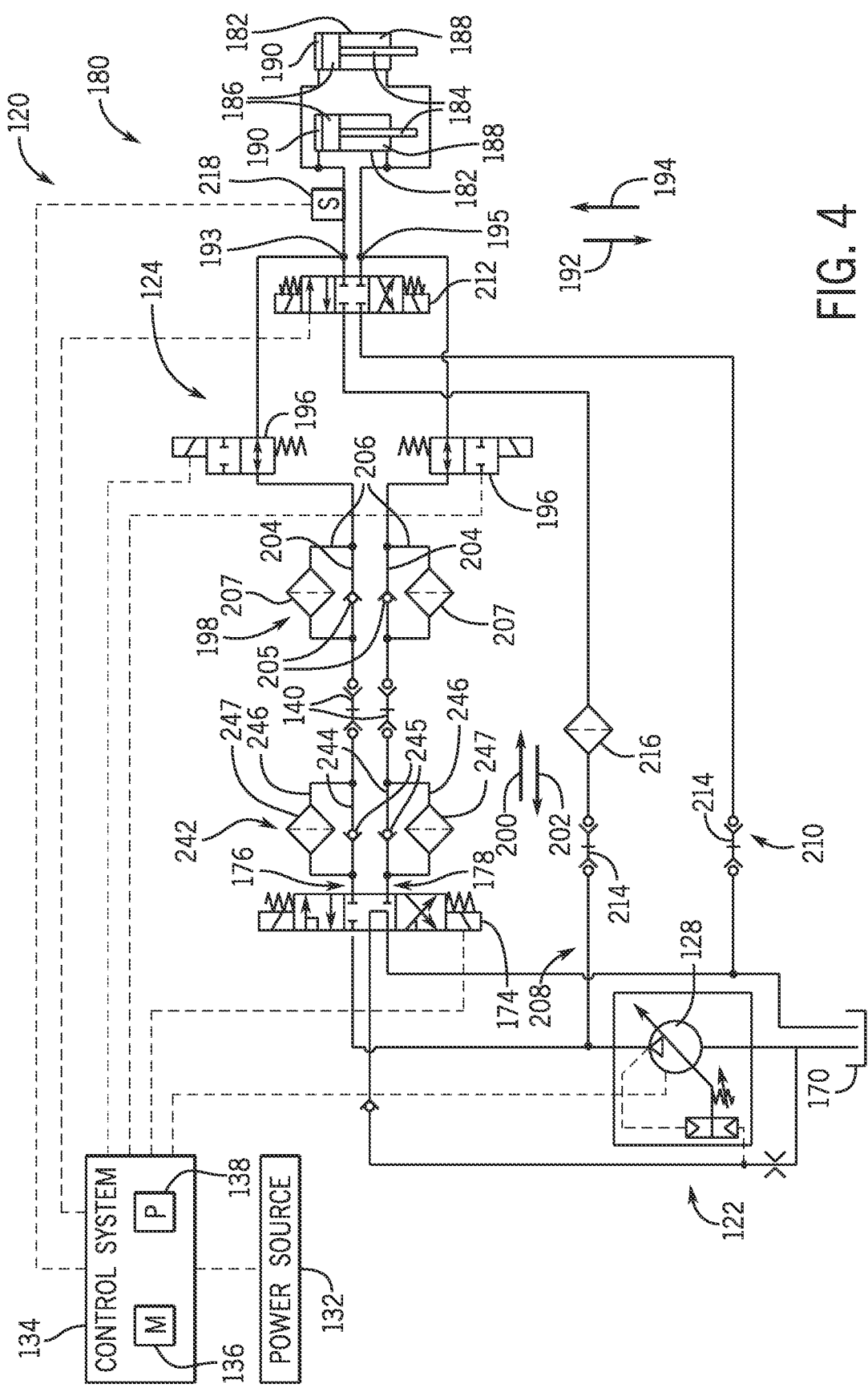
FIG. 4 is a schematic diagram of another embodiment of a hydraulic system that may be employed by the agricultural system of FIGS. 1 and 2, in accordance with an aspect of the present disclosure.

FIG. 4 is a schematic diagram of another embodiment of a hydraulic system 240 that may be employed by the agricultural system of FIGS. 1 and 2. The hydraulic system 240 includes additional bi-directional filters 242 disposed on the bi-directional fluid lines 176, 178 between the hydraulic coupler 140 and the first valve 174. The additional bi-directional filters 242 enable fluid flow in either fluid direction 200, 202 and block contaminant flow in the second fluid direction 202. In the illustrated embodiment, each additional bi-directional filter 242 includes a check valve fluid line 244, which includes a check valve 245, and a filter fluid line 246, which includes a filter 247. The check valves fluid line 244 of each additional bi-directional filter 242 may be in a parallel flow configuration with respect to the filter fluid line 246. Further, the check valve 245 of each additional bi-directional filter 242 blocks fluid flow and contaminant flow through the check valve fluid line 244 in the second fluid direction 202 (e.g., from the hydraulic coupler 140 to the first valve 174) and enables fluid flow and contaminant flow through the check valve fluid line 244 in the first fluid direction 200 (e.g., from the first valve 174 to the hydraulic coupler 140). Thus, the check valve fluid line 244 enables contaminants to flow through the first valve 174 (e.g., from the pump 128) to the hydraulic coupler 140. Moreover, the filter 247 of each additional bi-directional filter 242 enables fluid flow through the filter fluid line 246 in the first fluid direction 200 and the second fluid direction 202, and blocks contaminant flow through the filter fluid line 246 in the first fluid direction 200 and the second fluid direction 202. As such, the filter fluid line 246 blocks contaminants from flowing through the first valve 174 in the second fluid direction 202, such as toward the reservoir 170.

The illustrated additional bi-directional filters 242 may block contaminant flow farther into the first hydraulic circuit 122 (e.g., from the hydraulic coupler 140 to the reservoir 170) while enabling contaminant flow away from the first hydraulic circuit 122 (e.g., from the pump 128 to the hydraulic coupler 140). Therefore, the additional bi-directional filters 242 may reduce the amount of contaminants in the first hydraulic circuit 122. For instance, contaminants may accumulate between the bi-directional filters 206 and the additional bi-directional filters 242 (e.g., adjacent to the hydraulic coupler 140) and/or on the filters 207, 247, rather than within the first hydraulic circuit 122 and/or within the second hydraulic circuit 124. Such contaminants may then be easily removed upon accessing the bi-directional filters 206 and/or the additional bi-directional filters 242.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A hydraulic system for an agricultural system, comprising:
a hydraulic circuit;
a flow valve;
a bi-directional filter disposed on a bi-directional fluid line of the hydraulic circuit, and the bi-directional filter comprises:
a check valve fluid line comprising a check valve configured to block a fluid from flowing through the check valve fluid line in a first direction and to enable the fluid to flow through the check valve fluid line in a second direction, opposite the first direction; and
a filter fluid line comprising a filter configured to enable the fluid to flow through the filter fluid line in the first direction and the second direction, wherein the filter is configured to block particles that are greater than a threshold size from passing through the filter fluid line, the filter fluid line is in a parallel flow configuration with respect to the check valve fluid line, and the bi-directional fluid line is configured to direct the fluid to bypass the flow valve via the check valve fluid line and the filter fluid line;
a single directional fluid line fluidly coupled to the flow valve, wherein the single directional fluid line is configured to direct the fluid through the flow valve, through a junction between the flow valve and a hydraulic cylinder, and to bypass the bi-directional filter, and the bi-directional fluid line is configured to direct the fluid through the junction and to bypass the flow valve; and an additional flow valve fluidly coupled to the bi-directional fluid line and configured to move between a first position and a second position, wherein the first position of the additional flow valve enables the fluid to flow through the bi-directional fluid line in the first direction, and the second position of the additional flow valve enables the fluid to flow through the bi-directional fluid line in the second direction.

2. The hydraulic system of claim 1, wherein the check valve is configured to enable the particles to pass through the check valve fluid line in the second direction.

3. The hydraulic system of claim 1, comprising the hydraulic cylinder configured to couple to a component of the agricultural system, the first direction is toward the hydraulic cylinder, and the second direction is away from the hydraulic cylinder.

4. The hydraulic system of claim 1, comprising a hydraulic coupler configured to fluidly couple the additional flow valve to the bi-directional filter.

5. The hydraulic system of claim 4, comprising an additional bi-directional filter disposed on the bi-directional fluid line between the additional flow valve and the hydraulic coupler, wherein the additional bi-directional filter comprises:
an additional check valve fluid line comprising an additional check valve configured to enable the fluid to flow through the additional check valve fluid line in the first direction and to block the fluid to flow through the additional check valve fluid line in the second direction; and
an additional filter fluid line comprising an additional filter configured to enable the fluid to flow through the additional filter fluid line in the first direction and the second direction, wherein the additional filter is configured to block the particles greater than the threshold size from passing through the additional filter fluid line, and the additional filter fluid line is in a parallel flow configuration with respect to the additional check valve fluid line.

6. The hydraulic system of claim 1, wherein the additional flow valve is configured to move to a third position that blocks fluid flow through the additional flow valve.

7. A hydraulic system for an agricultural system, the hydraulic system comprising:
a bi-directional fluid line configured to fluidly couple to a hydraulic cylinder of the agricultural system;
a flow valve disposed on the bi-directional fluid line, wherein the flow valve is configured to move between a first position and a second position, the first position of the flow valve enables a fluid to flow through the bi-directional fluid line in a first direction toward the hydraulic cylinder, and the second position of the flow valve enables the fluid to flow through the bi-directional fluid line in a second direction away from the hydraulic cylinder;
a bi-directional filter disposed on the bi-directional fluid line, wherein the bi-directional filter comprises:
a check valve fluid line comprising a check valve configured to block the fluid from flowing through the check valve fluid line in the first direction and to enable the fluid to flow through the check valve fluid line in the second direction; and
a filter fluid line comprising a filter configured to enable the fluid to flow through the filter fluid line in the first direction and the second direction, wherein the filter is configured to block particles that are greater than a threshold size from passing through the filter fluid line, and the filter fluid line is in a parallel flow configuration with respect to the check valve fluid line; and
an additional bi-directional filter disposed on the bi-directional fluid line, wherein the additional bi-directional filter comprises:
an additional check valve fluid line comprising an additional check valve configured to enable the fluid to flow through the additional check valve fluid line in the first direction and to block the fluid from flowing through the additional check valve fluid line in the second direction; and
an additional filter fluid line comprising an additional filter configured to enable the fluid to flow through the filter fluid line in the first direction and the second direction, wherein the additional filter is configured to block particles greater than an additional threshold size from passing through the additional filter fluid line, and the additional filter fluid line is in a parallel flow configuration with respect to the additional check valve fluid line.

8. The hydraulic system of claim 7, comprising a hydraulic coupler disposed on the bi-directional fluid line and configured to fluidly couple the flow valve to the hydraulic cylinder, wherein the bi-directional filter is positioned along a fluid path between the hydraulic coupler and the hydraulic cylinder.

9. The hydraulic system of claim 7, comprising a pump and a reservoir, wherein the pump is configured to direct the fluid from the reservoir to the hydraulic cylinder via the bi-directional fluid line while the flow valve is in the first position, and the reservoir is configured to receive the fluid from the hydraulic cylinder via the bi-directional fluid line while the flow valve is in the second position.

10. The hydraulic system of claim 7, comprising a control system configured to output a control signal indicative of instructions to move the flow valve to the first position or to the second position.

11. The hydraulic system of claim 7, wherein the hydraulic cylinder comprises a cap section and a rod section, and the bi-directional fluid line is fluidly coupled to the cap section of the hydraulic cylinder.

12. The hydraulic system of claim 11, comprising an additional bi-directional fluid line fluidly coupled to the rod section of the hydraulic cylinder, wherein the first position of the flow valve enables the fluid to flow through the additional bi-directional fluid line in the second direction away from the rod section, and the second position of the flow valve enables the fluid to flow through the additional bi-directional fluid line in the first direction toward the rod section.

13. The hydraulic system of claim 7, comprising an additional flow valve disposed on the bi-directional fluid line between the bi-directional filter and the hydraulic cylinder, wherein the position of the additional flow valve is configured to enable or block fluid flow from the flow valve to the hydraulic cylinder.

14. An agricultural system, comprising:
a first hydraulic circuit;
a second hydraulic circuit fluidly coupled to the first hydraulic circuit via a hydraulic coupler, wherein the second hydraulic circuit comprises a hydraulic cylinder and a bi-directional filter positioned between the hydraulic coupler and the hydraulic cylinder, and the bi-directional filter comprises:
a check valve fluid line comprising a check valve configured to block a fluid from flowing through the check valve fluid line in a first direction and to enable the fluid to flow through the check valve fluid line in a second direction, opposite the first direction; and a filter fluid line comprising a filter configured to enable the fluid to flow through the filter fluid line in the first direction and the second direction, wherein the filter is configured to block particles that are greater than a threshold size from passing through the filter fluid line, and the filter fluid line is in a parallel flow configuration with respect to the check valve fluid line.

15. The agricultural system of claim 14, comprising a work vehicle and an agricultural implement, wherein the work vehicle comprises the first hydraulic circuit and the agricultural implement comprises the second hydraulic circuit.

16. The agricultural system of claim 15, wherein the agricultural implement comprises a main wheel and a frame, the hydraulic cylinder comprises a body coupled to the frame and a rod, and the rod is coupled to the main wheel.

17. The agricultural system of claim 14, wherein the first hydraulic circuit comprises a flow valve fluidly coupled to the bi-directional filter via the hydraulic coupler, the flow valve is configured to move between a first position and a second position, the first position of the flow valve enables the fluid to flow through the bi-directional filter in the first direction, and the second position of the flow valve enables the fluid to flow through the bi-directional filter in the second direction.

18. The agricultural system of claim 17 wherein the first hydraulic circuit comprises a pump and a reservoir, the pump is configured to direct the fluid from the reservoir to the hydraulic cylinder through the bi-directional filter while the flow valve is in the first position, and the reservoir is configured to receive the fluid from the hydraulic cylinder via the bi-directional filter while the flow valve is in the second position.

* * * * *